United States Patent [19]
Hosoe et al.

[11] 3,933,412
[45] Jan. 20, 1976

[54] PROCESSING SYSTEM UTILIZING A MULTI-PURPOSE FILM HANDLING CARTRIDGE

[75] Inventors: Kazuya Hosoe, Machida; Yoshio Komine, Tokyo, both of Japan

[73] Assignee: Canon Kabushiki Kaisha, Japan

[22] Filed: May 29, 1974

[21] Appl. No.: 474,155

[30] Foreign Application Priority Data
May 31, 1973 Japan.............................. 48-61689
May 31, 1973 Japan.............................. 48-61679
May 31, 1973 Japan.............................. 48-61680

[52] U.S. Cl................................ 352/130; 352/182
[51] Int. Cl.²....................................... G03C 11/00
[58] Field of Search...................... 352/14, 182, 130

[56] References Cited
UNITED STATES PATENTS

| | | | |
|---|---|---|---|
| 728,488 | 5/1903 | Merrill................................ | 352/182 |
| 2,174,529 | 10/1939 | Proctor............................... | 352/182 |
| 3,244,469 | 4/1966 | Hennessey........................... | 352/14 |
| 3,800,306 | 3/1974 | Land.................................. | 352/130 |
| 3,809,327 | 5/1974 | Osman............................... | 352/130 X |

*Primary Examiner*—Monroe H. Hayes
*Attorney, Agent, or Firm*—Toren, McGeady and Stanger

[57] ABSTRACT

A system for processing a strip of motion picture film with a multi-purpose film handling cartridge adapted for use in film-exposing, processing and projection operations. Responsive to varying rates of travel of the film strip across a processing station provided in the cartridge as it is being transported between the paired spools to which respective ends of the film strip are attached, a variable-speed driving mechanism mounted externally of the cartridge controls the speed of the spool to establish a constant rate of travel of the film strip across the processing station at any particular instance even though the winding diameters of the film strip on the spools are ever being varied, so that a uniform application of a coating of processing fluid is effected along the length of the exposed film strip without the necessity of providing any particular constant speed device within the cartridge. The variable speed driving mechanism is associated with an actuating member adapted to be accessible to the operator from the outside of the system housing and which once manually operated for actuation cannot be released from the actuating position by hand but automatically released when the entire length of the film strip has been processed to thereby prevent accidental interruptions of the running processing operation.

28 Claims, 10 Drawing Figures

PROCESSING SYSTEM UTILIZING A MULTI-PURPOSE FILM HANDLING CARTRIDGE

BACKGROUND OF THE INVENTION

1. Field of the Invention

This invention relates to a processing system utilizing a multi-purpose motion picture film handling cartridge permitting the photographer himself to process and project the film strip easily and without failure. More particularly, it relates to a variable-speed driving mechanism adapted for association with externally mounted drive means of the cartridge to impart a constant speed to the film strip as it is transported across a processing station positioned within the cartridge.

2. Description of the Prior Art

The field of amatueur motion picture photography has developed rapid processing and projection systems utilizing compact multi-purpose film handling cartridges. The film handling cartridge is adapted to be mounted first in a motion picture camera for exposure purposes and then in a motion picture projector for projection purposes. After a strip of photographic motion picture film contained in the cartridge has been exposed, the film strip is processed with the cartridge remaining unremoved from the same camera employing a rapid processing system, or mounted in a specially designed processor, or in a processor-projector unit which is constructed for facilitating processing and projection operations. In these systems, the processing fluid is stored in an applicator positioned within the cartridge from which it is expressed onto the exposed film strip when the processing station is rendered operable. Examplary of such systems are those described in U.S. Pat. Nos. 3,644,024 and 3,604,790.

In applying a thin coating of processing fluid to an exposed strip of motion picture film contained in the cartridge, it is of importance to maintain constant the rate of travel of the film strip as it contacts the applicator, or otherwise uniform processing results can not be effected particularly when the exposed film is processed not in a processing laboratory but in the aforesaid rapid processing system employed in a camera projector, or a handy processor specially designed therefor. The presently proposed variable-speed driving mechanisms adapted for use in such rapid processing systems to impart a constant speed to the film strip as it contacts the applicator are described in U.S. Pat. Nos. 3,616,740 and 3,623,417. The variable speed driving mechanism disclosed herein is associated with a specially designed applicator to control the speed of a drive motor incorporated therein in accordance with the amount of processing fluid remaining in the applicator as it is expelled from the orifice of the applicator.

SUMMARY OF THE INVENTION

An object of the present invention is to provide a rapid processing system utilizing a multi-purpose motion picture film handling cartridge having an applicator positioned therein in a simple arrangement and permitting the photographer himself to process the exposed film strip easily and without failure.

The rapid processing system has eliminated the inconvenience associated with the time delay between the mailing of the cartridge containing an exposed film to a processing laboratory and its availability for projection. Such a rapid access to photographic information is very advantageous not only to users engaging in special photography requiring rapid interpretation of the developed film but also to those engaging in home motion picture photography. To enjoy such an advantage, it is to be recognized that the rapid processing system has to be provided with facilities for easy and steady handling of the cartridge of the type described. The present invention in one aspect contemplates a rapid processing system with facilities permitting the photographer himself to handle the cartridge of the type described easily and without failure. On the other hand, in processing the film strip with the cartridge, it is of importance to apply a uniform coating of processing fluid on the film strip along its length in a controlled constant coverage per unit of time.

Another object of the present invention, therefore, is to provide a novel method of imparting a constant speed to the film strip as it contacts the applicator, and a device for performing the method externally provided of the cartridge within the rapid processing system.

As is well known, with the film handling cartridge containing a pair of coplaner spools which constitutes the main part of the film advance means, the rate of travel of the film strip across the processing station is varied with variation in the winding diameters on the spools as the film strip is transported between the spools driven in a constant speed, thereby a uniform fluid coating on the film strip along its length cannot be effected during the entire operation of the applicator. To achieve the above mentioned object, the constant film transportation speed device constructed in accordance with a preferred embodiment comprises a constant speed motor and a variable speed driving mechanism, such as that comprising the opposed cone pulleys and a driving belt, arranged between the constant speed motor and the take-up spool upon operation of the mechanism to adjust the position of the belt in accordance as such a predetermined function of the diameter on the take-up spool, said function being programmed in belt-position adjusting means engaging with the take-up spool, that the variation in the winding diameter on the take-up spool is compensated for establishing a constant rate of travel of the film strip across the applicator as it is being transported from the supply spool to the take-up spool driven in varying speeds dependent upon the function.

According to another preferred embodiment, the constant film transportation speed device comprises a variable speed motor connected through suitable motion transmitting means to the take-up spool and a motor speed control circuit adapted to be responsive to the speed of a sprocket which is brought into engagement with perforation holes of the film strip when the processing station is rendered operable for maintaining a constant rate of travel of the film strip across the applicator as the film strip is being transported from the supply spool to the take-up spool driven in decreasing speeds even though it is coiled in turns of increasing diameters on the take-up spool.

Still another embodiment comprises a drive governor or motor engaging the take-up spool and a driven governor engaging the supply spool, the driven governor being selected to have such an inertia that the rate of travel of the strip across the applicator is held constant as it is being transported between the supply and take-up spools.

A further object of the invention is to provide a processing system provided with an indicator indicating for the operator how much proportion of the length of the film strip has been processed, the indicator being associated with the aforesaid variable-speed driving mechanism.

An additional object of the invention is to provide a mechanism of simple construction which jointly actuates and jointly releases the drive means including a motor and the variable-speed driving mechanism in response to an actuation and to a release, respectively, of a member movably mounted in the housing of the processing system, in which once the movable member is manually operated for the actuation, it can not be released from the actuating position by hand but it can be automatically released only when the entire length of the film strip has been processed, thereby manual accidental interruption of the processing operation can be prevented.

Other objects and features of the invention will become apparent from the following detailed description taken in conjunction with the accompanying drawings.

DETAILED DESCRIPTION OF THE PREFERRED EMBODIMENTS

Figure 1:
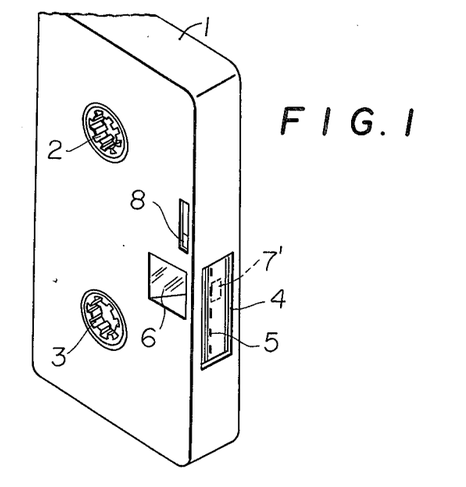
FIG. 1 is a perspective view of a multi-purpose motion picture film handling cartridge usable in the present invention.
Figure 2:
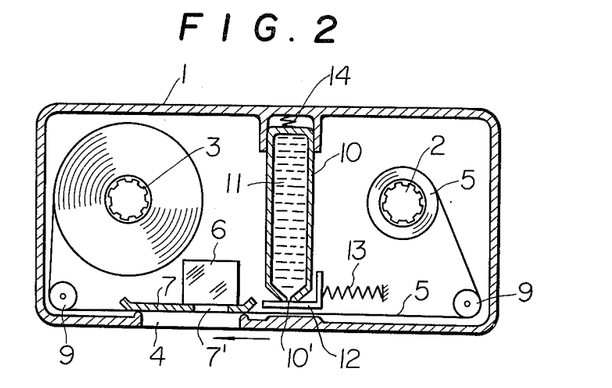
FIG. 2 is a sectional plan view of the cartridge of FIG. 1 illustrating an arrangement of various main parts in an exposing operation position.
Figure 3:
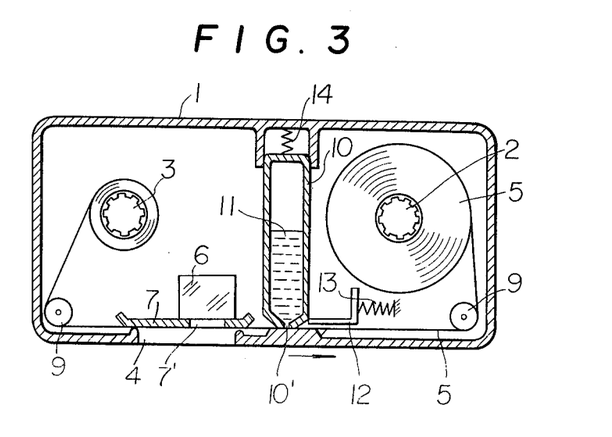
FIG. 3 is a sectional plan view of the cartridge of FIG. 1 illustrating an arrangement of various main parts in a processing operation position and particularly the operative relationship between the applicator and the film strip for applying a coating of processing fluid on the film strip.

Referring to FIGS. 1, 2 and 3, there is shown a multi-purpose motion picture film handling cartridge usuable in the invention. The cartridge comprises a housing 1, a supply spool 2 and take-up spool 3 coplanarly mounted therein for rotation about parallel axes to which respective ends of a strip of motion picture film 5 are permanently attached. The spools are provided with fluted recesses which are adapted to receive externally mounted drive means through apertures provided through the cartridge's wall as shown in FIG. 1, constituting means for reversibly transporting the film strip 5 between the supply spool 2 and the take-up spools 3 across an opening 4. The opening 4 constitutes a film gate adapted to serve as an exposure station during a first pass of the photosensitive film strip 5 across the pressure plate 7 as shown in FIG. 2 and as a projection station during subsequent operations in which the film strip, in a fully processed condition, is advanced from the supply spool 2 to the take-up spool 3 across a projection aperture 7' provided through the pressure plate 7 and with a reflecting mirror 6 mounted on the opposite side of the pressure plate 7 to the film 5. The housing 1 is provided with an elongated slot 8 passing through the wall adapted to receive an externally mounted actuator when the cartridge is mounted in the processing system for purposes of effecting an upward displacement of the actuator along the slot 8 when the processing station is rendered operable, thereby seal means 12 normally biased by a spring 13 for sealing the orifice 10' of an applicator 10 is displaced into an unsealing relationship with the applicator 10 as shown in FIG. 3 to permit the processing fluid 11 contained in the applicator 10 to be expressed onto the film strip 5 as it is being transported from the take-up spool 3 to the supply spool 2 as shown in FIG. 3.

Figures 4, 6:
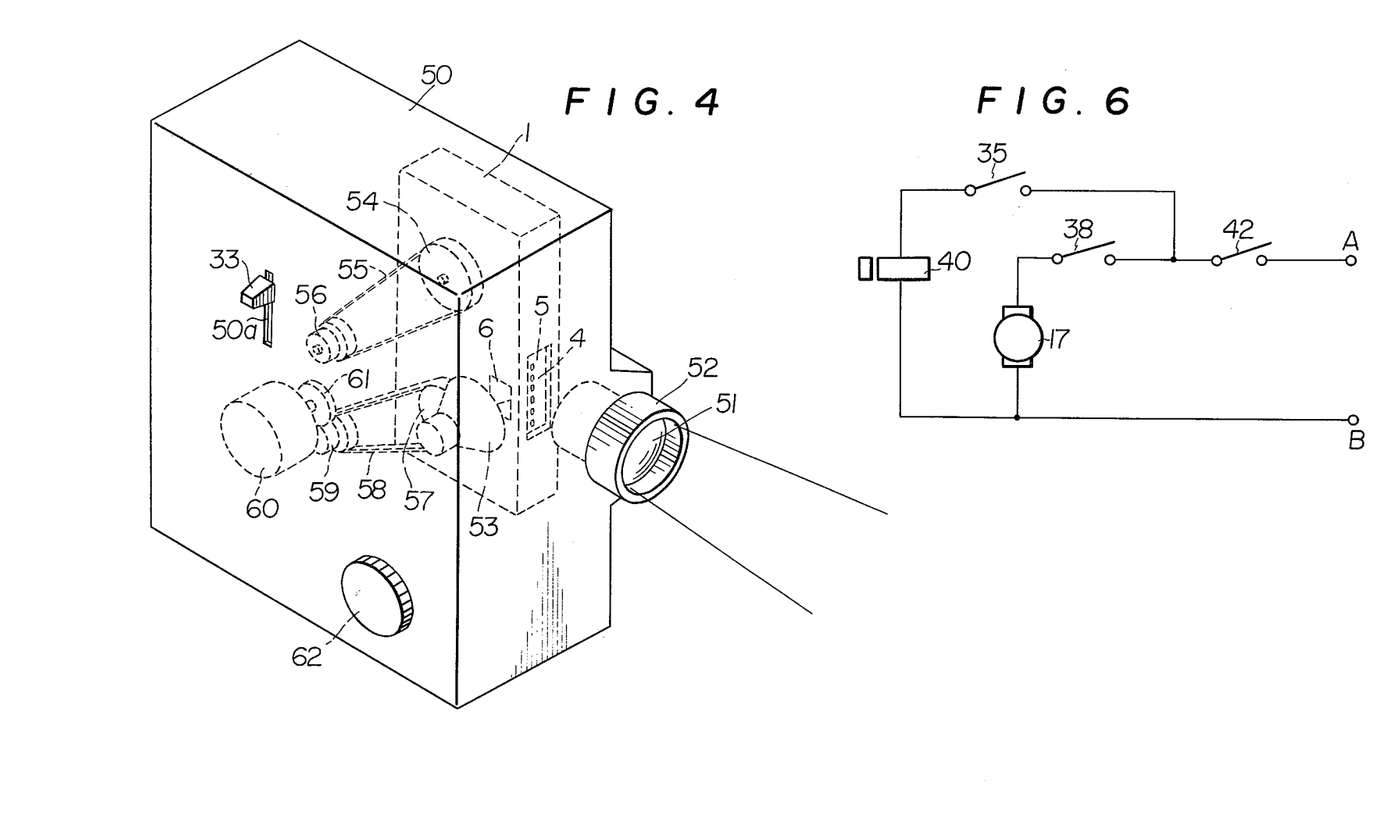
FIG. 4 is a perspective view of a projector adapted to receive the cartridge of FIG. 1 after the film strip has been fully processed in a stage shown in FIG. 3.
FIG. 6 is a circuit diagram of the device of FIG. 5.

In operation of the cartridge 1, after the film strip has been exposed, the cartridge 1 is mounted in a processor-projector unit employing the processing system of the invention for facilitating processing and projection operations. As shown in FIG. 4, the processorprojector unit comprises a housing 50, a projection lens 51 mounted in a lens mount 52, an illumination system including a lamp 53 and drive means shown in phantom. The rear panel of the housing 50 is provided with a control knob 62 for selection of processing and projection operations and with a processing operation actuating knob 33 movable along the slot 50a passing through the unit's wall. The cartridge 1 is positioned in the housing 50 of the processor-projector unit as shown in phantom, with the projector aperture 7' being in alignment with the projection system and with the reflecting mirror 6 being disposed to direct an illumination light beam coming from the lamp 53 to the projection aperture 7' to permit image carrying light rays to leave the cartridge 1 through the opening 4 and to be projected by the projection lens 51 onto a screen not shown. Further, the fluted recess of the spool 2 is engaged with a spindle shaft not shown on which a pulley 54 is coaxially mounted, while the fluted recess of the take up spool 3 is engaged with a spindle shaft not shown on which is coaxially mounted a pulley 57 connected by a belt 58 to another pulley 59 which is driven into rotation by a motor 60 through a friction gearing arrangement not shown engaging a friction gear 61 mounted on the shaft of the motor 60.

Figure 5:
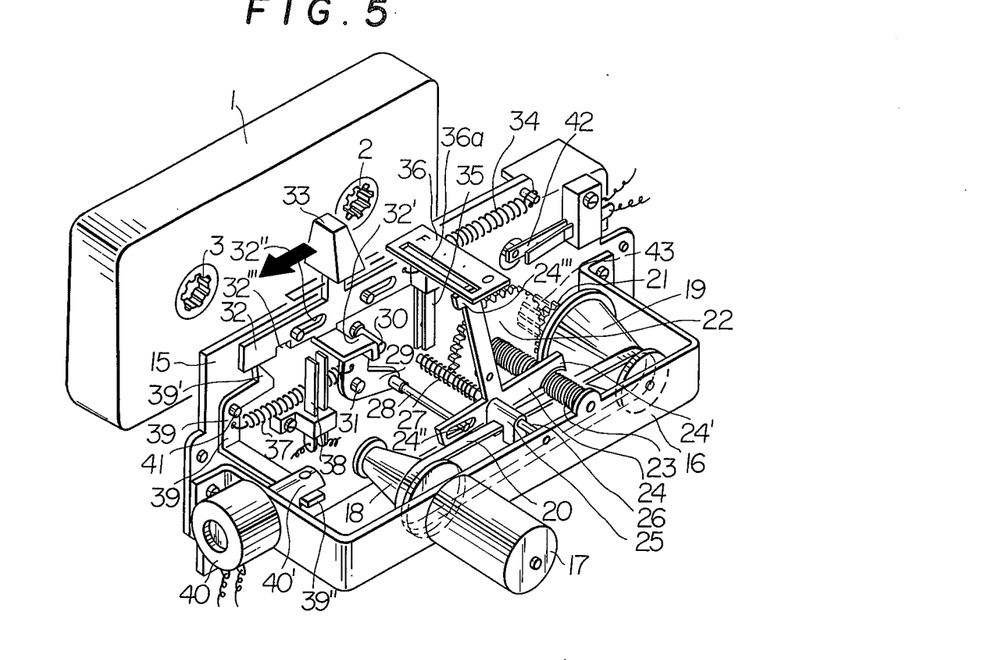
FIG. 5 is a perspective view of a preferred embodiment of a constant film transportation speed device adapted for use in the processing system according to the present invention, wherein all those parts non-essential for the invention have been omitted.

Referring now to FIG. 5, one preferred embodiment of a constant film transportation speed device is illustrated as comprising a housing including members 15 and 16, the outer side of the housing member 15 constituting a portion of the wall of a cartridge chamber, a constant speed motor 17 mounted on the housing member 16 and a variable-speed driving mechanism mounted between the housing members 15 and 16 and comprising the opposed cone pulleys 18 and 19 and a driving belt 20, the position of which is adapted to be adjusted by a forked slider 25 movably mounted on the guide rod 26 and biased by an expansion spring 27 to urge the slider 25 toward the maximum speed position of the cone pulley assembly 18 and 19. Fixedly mounted on the slider 25 is a lever 24 which is fulcrumed about the rod 26 and of which one arm 24' has a bevelled edge formed at an end portion adapted to be engageable with a worm gear 23 rotatably mounted between the housing member 15 and 16 when the variable-speed driving mechanism is actuated by the operation of an actuating member 32 movably mounted on the housing member 15. Coaxially mounted on the worm gear 23 is a gear 22 engaging a pinion gear 21 coaxial to the shaft of the cone pulley 19. These elements 21, 22, 23, 24 and 25 form part of the belt position adjusting means. One end of the shaft of the cone pulley 19 is adapted to engage the fluted recess of the supply spool 2 which serves as the take-up spool during processing operations, when the cartridge is mounted in the cartridge chamber behind the housing member 15. The other arm 24, of the lever 24 is provided with a longitudinally elongated slot in which an elongated crank pin 28 mounted on a web of a bell crank 29 which is mounted on a pivot pin 31 and which is biased by a helical spring 37 in a counter-clockwise direction. The other web of the bell crank 29 has a pin 30 mounted at an end portion for abutting engagement with an extension 32' of a slide 32 having longitudinally elongated slots 32 in which respective pins mounted on the housing member 15 are engaged. The slide 32 having a hand knob 33 which is accessible to the operator from the outside of the processor-projector unit as shown in FIG. 4 is normally biased by a helical spring 34 toward the position shown in FIG. 5. These elements 28, 29, 30, 31, 32, 33 and 34 form part of the actuating mechanism which jointly actuates and jointly releases the constant speed motor 17 and the variable-speed driving mechanism 18, 19, 20 and 43 in response to an actuation and a release, respectively, of the slide 32 with its hand knob 33. When the slide 32 is advanced in a direction indicated by the arrow, the pawl 39' of a lock lever 39 pivots about a pin 41 planted on the housing member 15 in a counter-clockwise direction under the force of the spring 37. Such a pivotal movement of the lever 39 results in an outward movement of a plunger 40' of an electromagnet 40 mounted on the housing member 16. It is to be noted that once the slide 32 is manually set in an advanced position, it is locked by the lock lever 39 and cannot be released by hand from the advanced position to the initial position, but it is released when the solenoid of the electromagnet 40 is energized to cause an inward movement of the plunger 40' which results in the disengagement of the pawl 39' from the recessed portion 32'''. The device of FIG. 5 is further provided with switches connected with one another and to the terminals A and B of a power source as shown in FIG. 6 and arranged in the following manners. The normally open switch 42 is positioned so that when the cartridge is inserted into the cartridge chamber, the fixed contact and the movable contact having a projection extending into the cartridge chamber is closed in engagement of the projection with the cartridge's wall. The normal open switch 38 is positioned adjacent the extension 32' of the slide 32 upon setting of the slide 32 to its locked position to be closed in engagement of the movable contact thereof with the extension 32'. The normally open switch 35 is positioned in a path of an extension 24''' of the lever 24 so that it is closed when the belt 20 has reached the minimum speed position.

The operation of the device shown in FIGS. 5 and 6 is as follows. For a processing purpose, the cartridge containing an exposed film strip coiled on the take-up spool 3 is inserted into the cartridge chamber. During the insetting operation, the fluted recess of the supply spool 2 is brought into engagement with a spindle shaft 43 and, at the same time, the switch 42 is closed by the engagement of the projection with the wall of the cartridge 1. Next, for initiation of the processing operation, the knob 33 is advanced in the direction of the arrow, thereupon the bell crank 29 is turned in a counter-clockwise direction under the force of the spring 37, and, in response thereto, the lever 24 is turned in a clockwise direction by the engagement of the crank pin 28 with the slot 24'' to cause the bevelled edge 24' of the lever 24 to engage the worm gear 23 at the maximum speed position. At the same time, the switch 38 connected in series with the switch 42 is closed so that the motor 17 is energized to drive the variable speed mechanism. Further, such a sliding movement of the slide 32 results in a displacement of the seal means 12 into an unsealing relationship with the orifice 10 of the applicator 10. As the driven cone pulley 19 is rotated with rotation of the supply spool 2, the gear 22 engaging the pinion gear 21 coaxial to the shaft of the pulley 19 is rotated with rotation of a worm gear 23 which causes the position of the belt 20 to vary in such a manner that the rate of travel of the film strip across the applicator is held constant during the entire operation of the applicator as it is being transported from the take-up spool 3 to the supply spool 2 which is driven in decreasing speeds. The indicator 36 is provided with a slot 36a through which the extension 24''' can be seen in registration with the scale of the indicator 36. Reading the indicium on the scale which registers with the position of the extension 24''', the operator can estimate how much proportion of the length of the film strip has been processed or remains unprocessed. When the entire length of the exposed film strip has been processed, the lever 24 is brought into contact with the switch 35, thereby the switch 35 is closed to energize the solenoid of the electromagnet 40, so that the lock pawl 39' is disengaged from the recess 32'''. When the slide 32 is returned to its initial position, the switch 38 is opened to deenergize the motor 17. At the same time, such a release movement of the slide 32 causes the bell crank 29 to turn in a clockwise direction, resulting in the disengagement of the bevelled edge 24' of the lever 24 from the worm gear 23, thereupon the forked slider 25 and the belt 20 are reset by the force of the charged spring 27 to their starting position, i.e., the maximum speed position. Although the embodiment described above provide a provision for resetting the variable-speed driving mechanism to the initial position which is made in the switch 35, a modification may be made in such manner that responsive to an end signal such as a notch provided in the film strip at a position adjacent the termination of the film strip section which is to be continuously processed, a reasonable mechanism provided therefor energizes the solenoid of the electromagnet 40 to return the slide 32 to its initial position.

It will be seen from the foregoing description of one specific embodiment that the present invention provides a driving apparatus for use in processing an exposed strip of motion picture film with a cartridge of the type described, which apparatus is characterized by the use of a continuously variable speed driving mechanism arranged between the motion transmitting device associated with a motor and the spool type of film advance means provided in the cartridge for controlling the speed of the film advance means in accordance with the variation in the winding diameter on the driven spool to impart a constant speed to the film as it is being transported across the processing station positioned within the cartridge from a supply spool to the driven take-up spool, the provision for programming a constant film transportation speed establishing function relating the varying winding diameters to the speeds of the spool being made in the speed control means incorporated in the variable-speed driving mechanism. Therefore, it is to be understood that the driving apparatus permits the photographer himself to easily process the exposed film strip with the cartridge, while nevertheless effecting an uniform application of a coating of processing fluid onto the film strip along its entire surface. The driving apparatus is further provided with a mechanism which actuates and releases the driving apparatus to an active state and to an idle state in response to a manual actuation and to an automatical release, respectively, of a movable member which is accessible to the operator from the outside of the apparatus only when it is in its released position, and which is secured in its actuated position by engagement with lock means mounted in the apparatus until a switching device associated with an electromagnet device is operated to cause the lock means to be disengaged from the movable member in response to an operation condition of the speed control means, or to a detection of an end signal provided in the film strip. Therefore, it is to be understood that the driving apparatus permits the operator to handle the cartridge without failure for continuous processing of the film strip over its entire length because of the prevention of manual accidental interruption of the once initiated processing operation. Furthermore, the driving apparatus is provided with an indicator associated with the speed control means to permit the operator to estimate how much proportion of the length of the film strip has been processed or remains unprocessed.

Figure 7:
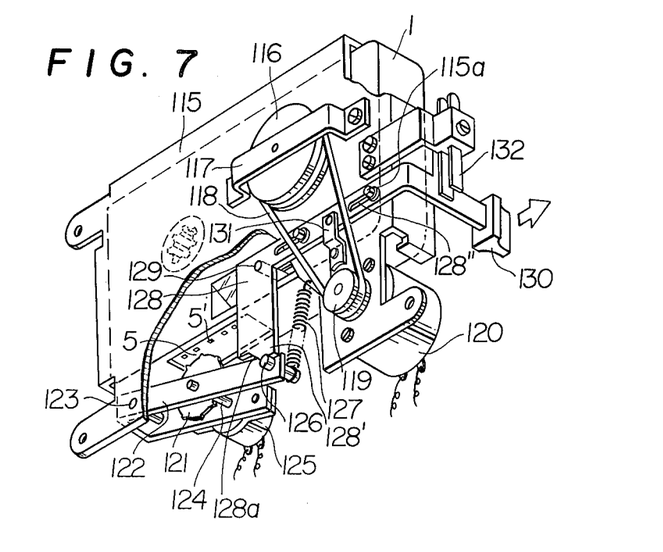
FIG. 7 is a perspective view of another embodiment of a constant film transportation speed device adapted for use in the processing system according to the invention.
Figure 8:
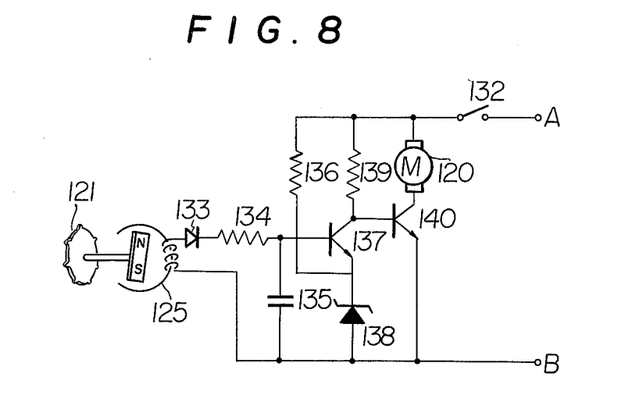
FIG. 8 is a circuit diagram of the device of FIG. 7.

Referring now to FIGS. 7 and 8, there is shown another embodiment of a constant film transportation speed system according to the invention. A cartridge 1 of the type described is mounted in the housing of a cartridge chamber provided in a processor not shown. One side wall of the housing 115 is provided with an aperture through which one end of the shaft of a pulley 116 engages a fluted recess provided in the supply spool of the cartridge 1. The other end of the shaft is journally mounted in a shaft mount 117, and the pulley 116 is connected by a belt 118 to a small drive pulley 119 coaxially mounted on the shaft of a variable speed motor 120, thus the spools constitute part of the film advance means of which the speed is varied with the speed of the motor 120. Movably mounted on the housing 115 is a slide 128 constituting part of an actuating mechanism and having two longitudinally elongated slots 128'' in which is slidably engaged respective pins 115a planted on the housing 115. The slide 128 is provided with an elongated pin 129 adapted to engage the seal means 12 (see FIGS. 3 and 4) through an elongated slot 8 (see FIG. 1) when the cartridge 1 is mounted in the chamber. The slide 128 is bent by an angle of about 90° at one end portion and the top edge of the bent portion is provided with a knob 130 which is accessible to the operator from the outside of the processor. The other end portion of the slide 128 is provided with an extension 128' extending perpendicularly to the length of the slide 128 and the top edge thereof is tapered to provide a camming surface 128a on which a cam follower 126 mounted on one end portion of paired arms 122 extending from a pin 123 is slidably engaged. Rotatably mounted at a center between the arms 122 is a sprocket wheel 121 through a shaft 124 of which one end is connected to a tachogenerator 125. The arms 122 are biased by a helical spring 127 to urge the cam follower 126 against the camming surface 128, and are arranged so that when the slide 128 is displaced in a direction indicated by the arrow, the sprocket wheel 121 is brought into operative relationship with the perforation holes 5' of the film strip 5. The displaced slide 128 is secured in its actuating position by a click spring 131 which also serves as a securing means in its released position. A main switch 132 of a control circuit to be subsequently described is positioned adjacent the extension of the slide 128 so that when the slide 128 is actuated, the main switch 132 is closed.

The operation of the mechanism shown in FIG. 7 is as follows. After the cartridge 1 is inserted in the chamber, the knob 130 is pushed in a direction indicated by the arrow, thereupon the main switch 132 of the control circuit shown in FIG. 8 is closed to energize the motor 120. At the same time, the teeth of the sprocket wheel 121 is brought into engagement with the perforation holes 5', thereby the rotation of the sprocket 121 is transmitted to the tacho-generator 125 which produces output voltages dependent upon the transportation speeds of the film strip. The alternating voltages produced in the tacho-generator 125 are rectified by a smoothing circuit comprising a rectifier diode 133, a resistor 134 and a condenser 135, and is applied to the base electrode of a transistor 137. The emitter electrode of the transistor 137 is connected to an interconnection between a resistor 136 and a constant voltage diode 138 which is selected to provide a reference voltage corresponding to a normal transportation speed of the film strip. The collector electrode of the transistor 137 is connected to a resistor 139 and to the base electrode of a drive transistor 140 of which the collector electrode is connected to the motor 120. An electric power is supplied between the two terminals A and B. When the rectified voltage of the alternating voltage from the tacho-generator 125 is almost equal to, or lower than the reference voltage of the diode 138, in other words, when the transportation speed of the film is equal to, or slower than a normal speed, the voltage between the base and emitter electrodes is almost zero, so that the transistor 137 is rendered non-conductive, thereby the transistor 140 is turned on to permit the motor 120 to rotate in increasing speeds. As the speed of the motor 120 increases with increase in the transportation speed of the film, the potential of the base electrode of the transistor 137 increases to render conductive the transistor 137. As a collector current flows through the transistor 137, the potential of the base electrode of the transistor 140 is decreased to render non-conductive the transistor 140, thereby the motor 120 is deenergized.

Figure 9:
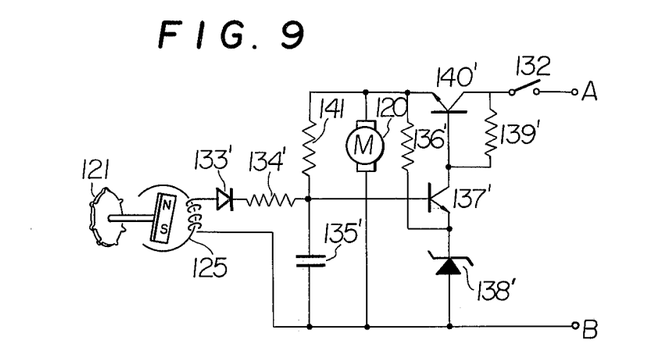
FIG. 9 is a circuit diagram shown in FIG. 8 with a modification.

In FIG. 9, there is illustrated an alternate embodiment of the control circuit for the mechanism shown in FIG. 7. The same numerals primed are employed in that figure to denote parts of that embodiment of the invention which remain substantially unchanged from the embodiment illustrated in FIG. 8. In the figure, the output of the tacho-generator 125 is converted to a direct current input by a circuit comprising a diode 133', resistor 134' and condenser 135', and the direct current is supplied to the base of a transistor 137', the base being connected to a resistor 141. When the base potential of the transistor 137' is equal to, or lower than the voltage of a reference diode 138', in other words, when the film transportation speed is equal to, or slower than a predetermined level, the transistor 137' is rendered non-conductive to increase the base potential of the transistor 140 so that the transistor 140 is rendered conductive to energize the motor 120. As the film transportation speed increases with increase in the base potential of the transistor 137', the transistor is turned off to deenergize the motor 120.

In the driving apparatus illustrated in FIG. 7 which is adapted for use in processing an exposed strip of motion picture film with a cartridge of the type described, a motor speed control circuit responsive to the speed of a sprocket wheel which is brought into operative relationship with the film strip when the processing system is rendered operative, and associated with a variable speed motor upon comparison of the sprocket speeds as detected in electrical signals with a reference signal to control the speed of the motor is provided for imparting a constant speed to the film strip to maintain a constant rate of travel of the film strip across the processing station within the cartridge as it is being transported from a supply spool to the driven take-up spool. Therefore it is to be understood that the driving apparatus of the invention permits the user to easily and steadily process the exposed film strip with the cartridge mounted in a processor, while still applying an uniform coating of processing fluid on the film strip along the length.

Figure 10:
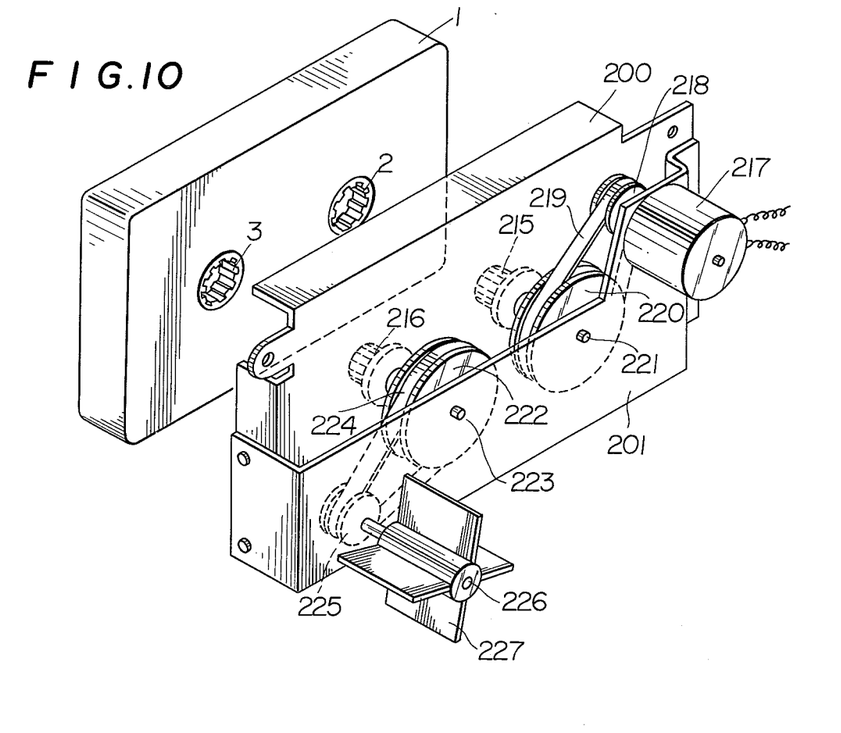
FIG. 10 is a perspective view of still another embodiment of the constant film transportation speed device adapted for use in the processing system according to the invention.

FIG. 10 illustrates one example of still another embodiment of the constant film transportation speed device according to the invention. The device comprises housing members 200 and 201, the back side of the housing member 200 defining part of a chamber for receiving the cartridge 1 of the type described, shafts 221 and 223 having fluted portions 215 and 216 formed at one end and extending into the chamber to engage the fluted recesses provided in the spools 2 and 3, respectively, pulleys 220 and 222 mounted on the shaft 221 and 223 respectively between the housing members 200 and 201. The pulley 220 is connected by a belt 219 to a drive pulley 218 mounted on the shaft of a motor 217, while the pulley 222 is connected by a belt 224 to a driven pulley 225 mounted on a shaft 226. The shaft 226 is provided with a governor 227 of windmill type. As is understood from the construction of the film advance means of spool type, the winding diameter of the film on the driven spool 2 is the minimum at the initiation of the processing operation, so that the spool 2 has to be driven in the maximum speed. As the winding diameter on the spool 2 increases, the speed of the spool 2 has to be decreased so as to maintain constant the transportation speed of the film strip through the processing station between the spools 2 and 3. On the other hand, as the film strip is transported from the spool 3 to the spool 2, the winding diameter on the spool 3 engaging the governor 227 is decreased with increase in the speed of the governor. On this account, the governor 227 is selected to have such an inertia as to maintain a constant transportation speed of the film across the processing station.

It will thus be appreciated that the processing system of the invention adapted for use with a multipurpose motion picture film handling cartridge of the types in which the rate of travel of the film strip across the processing station varies with time so long as the film advance means of the cartridge is driven in a constant speed may control the speed of the film advance means by provision of a suitable expedient mounted externally of the cartridge to impart a constant speed to the film strip so that a uniform coating of processing fluid can be applied on the film strip along its entire surface.

While there have been described what are, at present, considered to be preferred embodiments of the invention, it will be understood that variations and modifications can be effected within the spirit and scope of the invention as described hereinabove.

What is claimed is:

1. A film handling system capable of using a film cartridge comprising a film cartridge accommodating a strip of film therewithin and adapted to be utilized commonly in each process for exposure, development as well as projection of the film, said cartridge comprising a housing, a first reel means disposed within said housing for entwining a strip of film therearound at a predetermined position, a second reel means disposed within said housing for taking up said strip of film taken out from said first reel means, a means disposed within said housing for storing developer to develop said film, said means being provided with an opening wherefrom said developer is adapted to impinge selectively on the film path of said strip of film, an apparatus capable of effecting at least said development process for the film accommodated within said film cartridge, said apparatus comprising driving means for actuating said apparatus, said driving means being adapted to provide a driving force of nearly constant speed at all times, a film cartridge chamber for accommodating therewithin said film cartridge at a predetermined position, a film strip advance means for transporting said film in said film cartridge disposed within said film cartridge chamber, said means being arranged selectively to be mechanically linked with at least said second reel means and being actuated by the driving force of said driving means, a mechanical transducer means for decelerating the rotational speed of said film strip advance means with respect to the rotational speed of said driving means at a predetermined ratio corresponding to the amount of film taken around said second reel means, whereby the travelling speed of the film is substantially made constant when the film accommodated within said film cartridge is subjected to at least the development process.

2. A system, as described in claim 1, wherein said film cartridge includes an opening provided at a portion of said housing to expose the film accommodated within said cartridge, and an opening provided at a portion of said housing to permit the projection light flux to be incident upon said cartridge in order to project the film accommodated within said cartridge.

3. A system described in claim 2 wherein said developer storing means is provided with an opening for ejecting said developer, said opening housing having a means for obstructing the ejection of said developer.

4. A system as described in claim 3, wherein said film cartridge comprises an opening adapted to be accessible to a means for releasing the said means for obstructing the ejection of said developer from the outside of said housing.

5. A system as described in claim 1, wherein said mechanical transducer means comprises displacing means coordinated to correspond to the amount of the cartridge accommodating film which is wound up around said second reel means, and means for varying the transmission speed ratio disposed between said driving means and said film advance means in cooperation with said displacing means for varying the transmission speed ratio of said driving means for driving said film advance means with respect to said film advance means.

6. A system as described in claim 5, wherein said displacing means comprises a member for measuring the film, said member being operatively connected with said transmission speed ratio varying means.

7. A system as described in claim 6, wherein said transmission speed ratio varying means comprises first and second pulleys arranged parallel with each other, and an endless band running around said first and second pulleys operatively connected with said film measuring member so as to be displaceable on said pulleys along the axial directions thereof in cooperation with the displacement of said displacing means, said first pulley being formed to be continuously larger in diameter along the axial direction thereof and being rotatable by said driving means, said second pulley being formed to be continuously larger in diameter in the inverse direction to said first pulley and being rotatable with the help of the rotational motion of said first pulley through said endless band.

8. A film handling system capable of using a film cartridge comprising a film cartridge accommodating a strip of film therewithin and adapted to be utilized commonly in each process for exposure, development and projection of the film, said cartridge comprising a housing, a first reel means disposed within said housing for entwining a strip of film therearound at a predetermined position, a second reel means disposed within said housing for taking up said strip of film out from said first reel means, a means disposed within said housing for storing developer to develop said film, said means being provided with an opening through which said developer is adapted to impinge selectively on the film path of said strip of film, an apparatus capable of effecting at least the development process for the film accommodated within said film cartridge, said apparatus comprising a driving means for actuating said apparatus, said driving means being adapted to provide a driving force of nearly constant speed at all times, a film cartridge chamber for accommodating therewithin said film cartridge at a predetermined position, a film strip advance means for transporting said film in said film cartridge disposed within said film cartridge chamber, said means comprising a first pulley mechanically linked with said driving means, said pulley being formed to be continuously larger in diameter along the axial direction thereof and being rotated by said driving force of said driving means, a second pulley mechanically linked with said second reel means selectively to be rotated, said pulley being formed to be continuously larger in diameter along the inverse direction to said first pulley, an endless band running around said first and second pulleys, and continuously displaceable on said pulleys along the axial directions thereof, and means for controlling the displacement of said endless band corresponding to the total rotational frequency of said second pulley, said control means comprising means rotatable in association with said second pulley whereby the running path of said endless band is adapted to be displaced corresponding to the amount of the film entwined around said second reel means so as to render the film transportation speed substantially constant at the time of passing on said opening for appearance of said developer by virtue of varying the speed ratio of said second pulley to said first pulley.

9. A system as described in claim 8, wherein said film cartridge includes an opening provided at a portion of said housing to expose the film accommodated within said cartridge, and an opening provided at a portion of said housing to permit the projection light flux to be incident upon said cartridge in order to project the film accommodated within said cartridge.

10. A system as described in claim 9, wherein said developer, storing means is provided with an opening for ejecting said developer said opening having a means for obstructing the ejection of said developer.

11. A system as described in claim 10, wherein said film cartridge comprises an opening, means for releasing said means for obstructing the ejection of said developer accessible through said opening from the outside of said housing.

12. A system as described in claim 11, wherein said control means comprises a member for measuring the film, said member being operatively connected with said endless band.

13. A film handling system capable of using a film cartridge comprising a film cartridge accommodating a strip of film therewithin and adapted to be utilized commonly in each process for exposure, development and projection of the film, said cartridge comprising a housing, a first reel means disposed within said housing for entwining a strip of film therearound at a predetermined position, a second reel means disposed within said housing for taking up said strip of film taken out from said first reel means, a means disposed within said housing for storing developer for developing said film, said means being provided with an opening wherefrom said developer is adapted to impinge selectively on the film path of said strip of film, an apparatus capable of effecting at least said development process for the film accommodated within said film cartridge, said apparatus comprising a film cartridge chamber accommodating said film cartridge therewithin at a predetermined position, driving means for rotating said second reel means, said driving means being mechanically linked at least with said second reel means when said film cartridge is in said film cartridge chamber, means for controlling the rotational speed of said driving means, said control means comprising a tacho-generator means, said tacho-generator means being engaged selectively with a portion of said film and comprising a rotation means having a part thereof made of a ferromagnetic material to be rotatable in response to the transportation of said film, and a coil means engaged with said rotation means electromagnetically to generate electrical signals corresponding to the rotational speed of said rotation means, switching means arranged electrically between said coil means and said driving means, said switching means being actuated in response to electrical signals from said coil means so as to control the supply of electric current to said driving means, whereby said switching means is controlled by electrical signal from said coil means, said signal of which is generated in response to the film transportation speed at least in the development process for the film accommodated within said film cartridge so as to render the film transportation speed substantially constant.

14. A system as described in claim 13, wherein said film cartridge includes an opening provided at a portion of said housing to expose the film accommodated within said cartridge and an opening provided at a portion of said housing to permit the projection light flux to be incident upon said cartridge in order to project the film accommodated within said cartridge.

15. A system as described in claim 14, wherein said developer storing means is provided with an opening for ejecting said developer, said opening having a means for obstructing the ejection of said developer.

16. A system as described in claim 15, wherein said film cartridge comprises an opening, a means for releasing said means for obstructing the ejection of said developer through said opening accessible from the outside of said housing.

17. A system as described in claim 13, wherein said rotation means includes a sprocket wheel which is adapted to be rotatable in engagement with perforation holes of said film.

18. A system as described in claim 17, wherein said rotation means includes a permanent magnet mounted coaxially with said sprocket wheel to be rotatable with said sprocket wheel, said coil means being arranged around said permanent magnet.

19. A system as described in claim 13, wherein said switching means comprises a transistor circuit.

20. A film handling system capable of using a film cartridge comprising a film cartridge accommodating a strip therewithin and adapted to be utilized commonly in each process for exposure, development and projection of the film, said cartridge comprising a housing, a first reel means disposed within said housing for entwining a strip of film therearound at a predetermined position, a second reel means disposed within said housing for taking up said strip of film taken out from said first reel means, a means disposed within said housing for storing developer to develop said film, said means being provided with an opening through which said developer is adapted to impinge selectively on the film path of said strip of film, an apparatus capable of effecting at least the development process for the film accommodated within said film cartridge, said apparatus comprising a film cartridge chamber for accommodating therewithin said film cartridge at a predetermined position, driving means for actuating said apparatus, said driving means being adapted to be mechanically linked at least with said second reel means when said film cartridge is in said film cartridge chamber and including a rotation driving means for rotating said second reel means, a tacho-generator means, said tacho-generator means comprising a sprocket wheel adapted to be rotatable in engagement with perforation holes of said film, said sprocket wheel being rotated in cooperation with the travelling action of said film. a permanent magnet rotatable with said sprocket wheel, a coil means engaged electromagnetically with said permanent magnet, said coil means generating electric signals corresponding to the rotational speed of said permanent magnet, a switching means actuated in response to electrical signals emitted from said coil means and adapted to control the supply of electric current to said driving means as well as to maintain the rotational speed of said rotation driving means constant, said switching means arranged electrically between said coil means and said rotation driving means, whereby, at the time of effecting at least the development process for the film accommodated within said film cartridge, said switching means is controlled by electric signals emitted from said coil means and generated in response to the film transportation speed which is to be rendered substantially constant.

21. A system as described in claim 20, wherein said film cartridge includes an opening provided at a portion of said housing to permit the projection light flux to be incident upon said cartridge in order to project the film accommodated within said cartridge.

22. A system as described in claim 21, wherein said developer storing means is provided with an opening for ejecting said developer, said opening having a means for obstructing the ejection of said developer.

23. A system as described in claim 22, wherein said film cartridge comprises an opening adapted to be accessible to a means for releasing the said means for obstructing the ejection of said developer from the outside of said housing.

24. A system as described in claim 20, wherein said switching means contains a transistor circuit.

25. A film handling system which can use a film cartridge comprising a film cartridge accommodating a strip of film therewithin and adapted to be utilized commonly in each process for exposure, development and projection of the film, said cartridge comprising a housing, a first reel means disposed within said housing for entwining a strip of film therearound at a predetermined position, a second reel means disposed within said housing for taking up said strip of film taken out from said first reel means, a means disposed within said housing for storing developer to develop said film, said means being provided with an opening wherefrom said developer is adapted to impinge selectively on the film path of said strip of film, an apparatus capable of effecting at least the development process for the film accommodated within said film cartridge, said apparatus comprising a driving means for rotating and driving said second reel means, said driving means being adapted to rotate said first reel means in cooperation with the backward feeding movement of said film entwined around said first reel means when said second reel means is driven for rotational motion, a braking means engaged with said first reel means, said braking means comprising a governor of the wind mill type for controlling the rotational speed of said first reel means with the help of air resistance corresponding to the rotational speed of said second reel means when said first reel means is rotated for effecting the backward feeding of said film, whereby the film transportation speed is rendered substantially constant when carrying out the development process for the film accommodated within said film cartridge.

26. A system as described in claim 25, wherein said film cartridge includes an opening provided at a portion of said housing to expose the film accommodated within said cartridge, and an opening provided at a portion of said housing to permit the projection light flux to be incident upon said cartridge in order to project the film accommodated within said cartridge.

27. A system as described in claim 26, wherein said developer storing means is provided with an opening for ejecting said developer, said opening having a means for obstructing the ejection of said developer.

28. A system as described in claim 27, wherein said film cartridge comprises an opening adapted to be accessible to a means for releasing said means for obstructing the ejection of said developer from the outside of said housing.

* * * * *